(12) United States Patent
Hirano

(10) Patent No.: US 9,598,555 B2
(45) Date of Patent: Mar. 21, 2017

(54) FLAME RETARDANT MATERIAL AND USE THEREOF

(71) Applicant: NITTO DENKO CORPORATION, Osaka (JP)

(72) Inventor: Keisuke Hirano, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/749,825

(22) Filed: Jun. 25, 2015

(65) Prior Publication Data

US 2015/0376366 A1    Dec. 31, 2015

(30) Foreign Application Priority Data

Jun. 26, 2014  (JP) ................................ 2014-130997
Aug. 27, 2014  (JP) ................................ 2014-172251

(51) Int. Cl.
| | | |
|---|---|---|
| *C08L 83/00* | (2006.01) | |
| *C08K 3/22* | (2006.01) | |
| *C09D 5/18* | (2006.01) | |
| *C09D 183/04* | (2006.01) | |
| *C08K 3/00* | (2006.01) | |
| *C08G 77/20* | (2006.01) | |

(52) U.S. Cl.
CPC .............. *C08K 3/22* (2013.01); *C08K 3/0058* (2013.01); *C09D 5/18* (2013.01); *C09D 183/04* (2013.01); *C08G 77/20* (2013.01); *C08K 2003/2224* (2013.01); *C08K 2003/2227* (2013.01)

(58) Field of Classification Search
CPC .......................... C08K 3/22; C08K 2003/2227
USPC ......................................... 524/506
See application file for complete search history.

(56) References Cited

U.S. PATENT DOCUMENTS

| 4,156,674 A * | 5/1979 | Sumimura ........... C08K 5/3475 |
| | | 260/DIG. 24 |
| 4,505,955 A * | 3/1985 | Meddaugh ........... C08K 3/0033 |
| | | 427/158 |
| 5,861,451 A | 1/1999 | Shroeder et al. |
| 5,880,199 A | 3/1999 | Matsushita et al. |
| 5,973,030 A | 10/1999 | Matsushita et al. |
| 2009/0017316 A1 * | 1/2009 | Kato ....................... C08L 79/04 |
| | | 428/447 |
| 2009/0246499 A1 * | 10/2009 | Katsoulis ............. C09D 183/04 |
| | | 428/220 |
| 2014/0178684 A1 * | 6/2014 | Kabutoya .............. C09J 7/0264 |
| | | 428/354 |

FOREIGN PATENT DOCUMENTS

| CN | 101205441 | * | 6/2008 |
| CN | 101205441 A | | 6/2008 |
| JP | 671802 A | | 3/1994 |
| JP | 200643974 A | | 2/2006 |
| WO | 2014/090105 A1 | | 6/2014 |

OTHER PUBLICATIONS

Partial European Search Report issued Sep. 29, 2015, issued by the European Patent Office in counterpart European Patent Application No. 15173559.4.
"Database WPI Week 200902", Thomson Scientific, London, Great Britain, AN 2009-A35831, 2 pages total, XP 002751934 (CN 101205441).
European Search Report issued Dec. 18, 2015, issued by the European Patent Office in counterpart European Patent Application No. 15173559.4.
Communication dated Aug. 31, 2016, issued by the European Patent Office in counterpart European application No. 15173559.4.

* cited by examiner

*Primary Examiner* — Hui Chin
(74) *Attorney, Agent, or Firm* — Sughrue Mion, PLLC

(57) ABSTRACT

The present invention relates to a flame retardant material including: a silicone resin; and a flame retardant filler, in which the silicone resin is at least one selected from the group consisting of an addition type silicone resin, a self-crosslinking type silicone resin, a silicone resin component of a silicone rubber film-forming type emulsion and a silicone rubber powder.

8 Claims, 1 Drawing Sheet

FLAME RETARDANT MATERIAL AND USE THEREOF

FIELD OF THE INVENTION

The present invention relates to a flame retardant material and a use thereof.

BACKGROUND OF THE INVENTION

As a means of imparting flame retardancy to various substrates, a flame retardant coating material is known.

As the flame retardant coating material, in general, an organic coating material containing an organic resin, a flame retardant filler and an organic solvent has been widely used (e.g., Patent Documents 1 and 2).

However, since an organic coating material contains an organic resin, there are a problem that high flame retardancy cannot be exhibited and a problem that the coating material is inferior in solvent resistance. Furthermore, the organic resin used in the organic coating material involves a problem that it is difficult to use it on a soft substrate by application since a resin having high hardness after curing is generally used as the organic resin.

Patent Document 1: JP-A-6-071802
Patent Document 2: JP-A-2006-043974

SUMMARY OF THE INVENTION

An object of the present invention is to provide a flame retardant material which can exhibit high flame retardancy, is also excellent in solvent resistance, and results in a soft film. A further object thereof is to provide a flame retardant film formed from such a flame retardant material. A still further object thereof is to provide a flame retardant article having such a flame retardant film.

Namely, the present invention relates to the following items (1) to (7).
(1) A flame retardant material including:
   a silicone resin; and
   a flame retardant filler,
   in which the silicone resin is at least one selected from the group consisting of an addition type silicone resin, a self-crosslinking type silicone resin, a silicone resin component of a silicone rubber film-forming type emulsion and a silicone rubber powder.
(2) The flame retardant material according to (1), in which the addition type silicone resin is a two-component RTV silicone rubber.
(3) The flame retardant material according to (1), in which the addition type silicone resin is a silicone resin component of an O/W type emulsion in which a reactive silicone is emulsified with an emulsifier.
(4) The flame retardant material according to any one of (1) to (3), in which a content ratio of a total amount of solid matter of the addition type silicone resin, solid matter of the self-crosslinking type silicone resin, solid matter of the silicone rubber film-forming type emulsion and the silicone rubber powder to an amount of the flame retardant filler is, in terms of weight ratio, as follows:
   (solid matter of addition type silicone resin+solid matter of self-crosslinking type silicone resin+solid matter of silicone rubber film-forming type emulsion+silicone rubber powder):flame retardant filler=5:1 to 1:5.
(5) The flame retardant material according to any one of (1) to (4), which further includes a solvent.
(6) A flame retardant film formed from the flame retardant material according to any one of (1) to (5).
(7) A flame retardant article having the flame retardant film according to (6).

According to the present invention, it is possible to provide a flame retardant material which can exhibit high flame retardancy, is also excellent in solvent resistance, and results in a soft film. Moreover, it is possible to provide a flame retardant film formed from such a flame retardant material. Furthermore, it is possible to provide a flame retardant article having such a flame retardant film.

DETAILED DESCRIPTION OF THE INVENTION

<Flame Retardant Material>

Figure 1:
FIG. 1 is a schematic cross-sectional view showing an example of the flame retardant article of the present invention.

The flame retardant material of the present invention includes a silicone resin and a flame retardant filler.

The silicone resin is at least one selected from the group consisting of an addition type silicone resin, a self-crosslinking type silicone resin, a silicone resin component of a silicone rubber film-forming type emulsion and a silicone rubber powder.

The addition type silicone resin may be one kind alone or two or more kinds. By adopting the addition type silicone resin, it is possible to solve the problem that the solvent resistance is inferior, unlike conventional organic resins.

Examples of the addition type silicone resin include a room-temperature curable silicone rubber (RTV silicone rubber), a low-temperature curable silicone rubber (LTV silicone rubber), and a silicone resin component of an O/W type emulsion in which a reactive silicone is emulsified with an emulsifier. In order to further exhibit the effects of the invention, the room-temperature curable silicone rubber (RTV silicone rubber) and the silicone resin component of an O/W type emulsion in which a reactive silicone is emulsified with an emulsifier are preferable.

The room-temperature curable silicone rubber (RTV silicone rubber) is a silicone rubber which has a liquid or paste form before curing and forms a rubber elastic body with the progress of a curing reaction at room temperature.

As the room-temperature curable silicone rubber (RTV silicone rubber), a one-component RTV silicone rubber or a two-component RTV silicone rubber may be preferably mentioned and, in order to further exhibit the effects of the invention, the two-component RTV silicone rubber is more preferable. Here, the two-component one is a type in which two liquids of a main agent and a curing agent are used with mixing them and, when the curing agent is added to the main agent, a curing reaction proceeds at room temperature to form a rubber elastic body.

Examples of the one-component RTV silicone rubber include KE-3423, KE-347, KE-3475, KE-3495, KE-4895, KE-4896, KE-1830, KE-1884, KE-3479, KE-348, KE-4897, KE-4898, KE-1820, KE-1825, KE-1831, KE-1833, KE-1885, KE-1056, KE-1151, KE-1842, KE-1886, KE-3424G, KE-3494, KE-3490, KE-40RTV, KE-4890, KE-3497, KE-3498, KE-3493, KE-3466, KE-3467, KE-1862, KE-1867, KE-3491, KE-3492, KE-3417, KE-3418, KE-3427, KE-3428, KE-41, KE-42, KE-44, KE-45, KE-441, KE-445 and KE-45S, which are manufactured by Shin-Etsu Chemical Co., Ltd.

Examples of the two-component RTV silicone rubber include KE-1800T-A/B, KE-66, KE-1031-A/B, KE-200, KE-118, KE-103, KE-108, KE-119, KE-109E-A/B, KE-1051)-A/B, KE-1012-A/B, KE-106, KE-1282-A/B, KE-1283-A/B, KE-1800-A/B/C, KE-1801-A/B/C, KE-1802-A/B/C, KE-1281-A/B, KE-1204-A/B, KE-1204-AL/BL, KE-1280-A/B, KE-513-A/B, KE-521-A/B, KE-1285-A/B, KE-1861-A/B, KE-12, KE-14, KE-17, KE-113, KE-24, KE-1414, KE-1415, KE-1416, KE-1417, KE-1300T, KE-1310ST, KE-1314-2, KE-1316, KE-1600, KE-1603-A/B, KE-1606, KE-1222-A/B, KE-1241, KEG-2000-40A/B, KEG-2000-50A/B, KEG-2000-60A/B, KEG-2000-70A/B, KEG-2001-40A/B, KEG-2001-50A/B, KE-1950-10A/B, KE-1950-20A/B, KE-1950-30A/B, KE-1950-35A/B, KE-1950-40A/B, KE-1950-50A/B, KE-1950-60A/B, KE-1950-70A/B, KE-1935A/B, KE-1987A/B, KE-1988A/B, KE-2019-40A/B, KE-2019-50A/B, KE-2019-60A/B, KE-2017-30A/B, KE-2017-40A/B, KE-2017-50A/B, KE-2090-40A/B, KE-2090-50A/B, KE-2090-60A/B, KE-2090-70A/B, KE-2096-40A/B, KE-2096-50A/B and KE-2096-60A/B, which are manufactured by Shin-Etsu Chemical Co., Ltd.

Examples of the O/W type emulsion in which a reactive silicone is emulsified with an emulsifier include Polon MR and Polon MK-206, which are manufactured by Shin-Etsu Chemical Co., Ltd.

The self-crosslinking type silicone resin may be one kind alone or two or more kinds. The self-crosslinking type silicone resin does not require a catalyst. By adopting the self-crosslinking type silicone resin, it is possible to use the flame retardant material without being affected by the storage stability of the silicone resin solution and weather, temperature, humidity, and the like.

Examples of the self-crosslinking type silicone resin include Polon MF-56, KM-2002L-1, KM-2002T, X-51-1318 and X-52-1631, which are manufactured by Shin-Etsu. Chemical Co., Ltd.

The silicone rubber film-forming type emulsion may be one kind alone or two or more kinds. The silicone rubber film-forming type emulsion is an emulsion which forms a silicone rubber film by drying and includes a self-crosslinking type which does not require a catalyst and a two-component type which uses a catalyst in combination. By adopting the silicone rubber film-forming type emulsion, a strong film can be formed as compared with the case of conventional silicone emulsions, so that the film can have resistance against scratches and the like.

Examples of the silicone rubber film-forming type emulsion include Polon MF-56, KM-2002L-1, KM-2002T, X-51-1318, X-52-1631, KM-9749 and Polon MF-40, which are manufactured by Shin-Etsu. Chemical Co., Ltd. Of these, for example, Polon MF-56, KM-2002L-1, KM-2002T, X-51-1318 and X-52-1631 are aforementioned self-crosslinking type silicone resins.

The silicone rubber powder may be one kind alone or two or more kinds. The silicone rubber powder is preferably obtained by removing water from a water dispersion of the silicone rubber powder. By adopting the silicone rubber powder, the strength of the resulting silicone film can be remarkably improved or, by controlling the size of the powder on the surface of the film, unevenness can be imparted and thus touch feeling and the like are improved or, when silicone films are overlapped, they can be easily peeled off.

Examples of the water dispersion of the silicone rubber powder include KM-9729 and X-52-1133, which are manufactured by Shin-Etsu Chemical Co., Ltd.

In the case where the silicone resin contained in the flame retardant material of the invention is an emulsion of a silicone resin, the emulsion may contain any other suitable materials within the range where the effects of the invention are not impaired. Examples of the other materials include colloidal silica, metal oxide sols, fluorine-based emulsions and silicone-based emulsions.

Examples of the colloidal silica include: SNOWTEX OXS, O, O40, OL, NSX, N, N40, XS, 30, 50, 30L and ZL which are manufactured by Nissan Chemical Industries, Ltd.; Quartron PL, PL3, PL7 and PL10 which are manufactured by Fuso Chemical Co., Ltd.; and ADELITE AT series manufactured by Adeka Corporation.

Examples of the metal oxide sols include a titania sol, a zirconia sol, an alumina sol and a barium titanate sol. Examples of the titania sol include TKS series manufactured by Tayca Corporation, DC-Ti series and DCN-Ti series manufactured by Fuji Titanium Industry Co., Ltd. Examples of the zirconia sol include Nanouse series manufactured by Nissan Chemical Industries, Ltd. and nanozirconia water dispersions manufactured by Sumitomo Osaka Cement Co., Ltd. Examples of the alumina sol include AS series manufactured by Nissan Chemical Industries, Ltd. and Biral Al series manufactured by Taki Chemical Co., Ltd.

Examples of the fluorine-based emulsions include UNI-DYNE series manufactured by Daikin Industries, Ltd. and SF Coat manufactured by AGC Seimi Chemical Co., Ltd. As the UNIDYNE series, TG-4571, 5541, 5545, 5546, 5601, and the like may be mentioned.

The flame retardant filler may be one kind alone or two or more kinds.

The flame retardant filler is preferably an inorganic filler having flame retardancy, and examples thereof include glass frit, metal hydroxides, metal oxides, metals and ceramics. Specifically, examples thereof include aluminum hydroxide, magnesium hydroxide, zirconium hydroxide, basic magnesium carbonate, dolomite, hydrotalcite, calcium hydroxide, barium hydroxide, hydrates of tin oxide, hydrates of inorganic metal compounds such as borax, zinc borate, zinc metaborate, barium metaborate, zinc carbonate, magnesium-calcium carbonate, calcium carbonate, barium carbonate, magnesium oxide, molybdenum oxide, zirconium oxide, tin oxide, antimony oxide and red phosphorus. These flame retardant fillers may be subjected to a surface treatment such as a silane coupling treatment or a stearic acid treatment. As the flame retardant filler, in order to further exhibit the effects of the invention, glass frit, aluminum hydroxide or magnesium hydroxide is preferable.

The shape of the flame retardant filler may be a regular shape or an irregular shape. Examples of the shape of the flame retardant filler include polygonal, cubic, elliptic, spherical, needle-like, flat plate-like and scale-like shapes or combinations of these shapes, or aggregates thereof.

As for the size of the flame retardant filler, an average of maximum width or length, for example, in the case of a particle form, an average particle diameter thereof is preferably from 0.01 µm to 50 µm, more preferably from 0.03 µm to 40 µm, further preferably from 0.05 µm to 30 µm, and particularly preferably from 0.05 µm to 20 µm.

As for the content ratio of the total amount of solid matter of the addition type silicone resin, solid matter of the self-crosslinking type silicone resin, solid matter of the silicone rubber film-forming type emulsion and the silicone rubber powder to the amount of the flame retardant filler, namely, (solid matter of addition type silicone resin+solid matter of self-crosslinking type silicone resin+solid matter of silicone rubber film-forming type emulsion+silicone rubber powder): flame retardant filler is preferably from 5:1 to 1:5, more preferably from 4:1 to 1:4, further preferably from 3:1 to 1:3, particularly preferably from 2:1 to 1:2, and most preferably from 1.5:1 to 1:1.5 in terms of weight ratio. When the content ratio of the total amount of solid matter of the addition type silicone resin, solid matter of the self-crosslinking type silicone resin, solid matter of the silicone rubber film-forming type emulsion and the silicone rubber powder to the amount of the flame retardant filler falls within the above range, it is possible to provide a flame retardant material which can exhibit higher flame retardancy, is also more excellent in solvent resistance, and results in a softer film.

The flame retardant material of the invention may further include a solvent. As such a solvent, any suitable solvents may be adopted within the range where the effects of the invention are not impaired as far as possible. Examples of the solvent include aromatic solvents such as benzene, toluene and xylene; ester-based solvents such as ethyl acetate; alcohol-based solvents such as methanol, ethanol, isopropyl alcohol and 2-propanol; and mixtures of the alcohol-based solvents with water.

As the content ratio of the solvent in the flame retardant material of the invention, any suitable content ratios may be adopted within the range where the effects of the invention are not impaired as far as possible. As such a content ratio, in order to further exhibit the effects of the invention, the solvent is preferably from 50 parts by weight to 1,000 parts by weight, more preferably from 60 parts by weight to 500 parts by weight, and further preferably from 70 parts by weight to 200 parts by weight relative to 100 parts by weight of the total amount of the silicone resin and the flame retardant filler.

The flame retardant material of the invention may include any suitable other components within the range where the effects of the invention are not impaired as far as possible. As such other components, for example, silicone compounds modified with an organic functional group are desirable. As such compounds, for example, reactive/unreactive silicone oils and the like may be mentioned. Examples of the silicone oils modified with an organic functional group include a side-chain modified type, a one-end modified type, a both-end modified type and a side-chain and both-end modified type (e.g., modified silicone oils of Shin-Etsu. Chemical Co., Ltd.). As organic groups of such organic modified silicones, there may be mentioned an amino group, an epoxy group, a carbinol group, a mercapto group, a carboxyl group, a (meth)acryloyl group, a polyether group, a phenol group, a silanol group, a carboxylic anhydride group, an alkyl group, an aralkyl group, a fluoroalkyl group, a higher fatty acid ester group and the like.

<Method for Producing Flame Retardant Material>

The flame retardant material of the invention can be, for example, obtained by mixing/stirring a silicone resin, a flame retardant filler, a solvent as required, and other components as required.

Upon the production of the flame retardant material of the invention, a mill treatment may be used in combination at the time of the above mixing/stirring. Namely, at the time of the above mixing/stirring, any suitable beads or the like may be added and mill grinding may be performed using a mill grinding machine or the like. By performing such a mill treatment, the dropout of the flame retardant filler from the flame retardant material may be made less prone to occur and also the transparency of the flame retardant material of the invention may be improved.

Examples of the beads that may be used for the mill treatment include zirconia beads, alumina beads, glass beads, stainless steel beads, nylon beads, Teflon (registered trademark) beads, steel balls, nylon-coated stainless steel beads and polyimide beads.

As a form of the flame retardant material of the invention, any suitable forms such as a liquid form, a semi-liquid form and a solid form may be possible depending on the kind and content ratios of the components. In the case of the liquid form, any suitable forms such as a homogeneous liquid form and a dispersed liquid form may be possible depending on the kind and content ratios of the components.

The flame retardant material of the invention can be applied to various fields. The flame retardant material of the invention can be, for example, applied to transporting equipments such as vehicles and airplanes, building materials, electronic materials, wires and cables, doors, panels, curtains, carpets, furniture, sun blinds, walls, ceilings, interior decoration materials, padding materials for boxes and the like, foams, encapsulating materials, and the like.

<Flame Retardant Film>

The flame retardant film of the invention is formed from the flame retardant material of the invention.

The flame retardant film of the invention can be preferably formed by applying the flame retardant material of the invention on any suitable substrate and curing the silicone resin.

As a method for curing the silicone resin, any suitable method may be adopted as long as it is a curing method suitable for the silicone resin to be used. For example, the method is thermal curing or photo-curing.

As for the thickness of the flame retardant film of the invention, any suitable thickness may be adopted depending on the purpose. The thickness of the flame retardant film is preferably from 1 μm to 500 μm, more preferably from 5 μm to 500 μm, further preferably from 10 μm to 500 μm, and particularly preferably from 10 μm to 400 μm.

<Flame Retardant Article>

The flame retardant article of the invention has the flame retardant film of the invention.

The flame retardant article of the invention may have any suitable structure as long as it has the flame retardant film of the invention.

Figure 2:
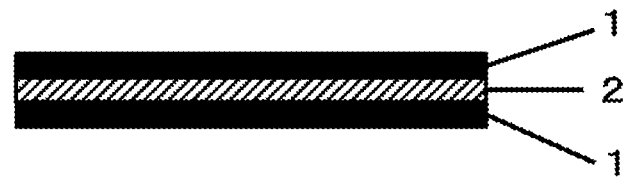
FIG. 2 is a schematic cross-sectional view showing another example of the flame retardant article of the present invention.

Typical examples of the flame retardant article of the invention include a flame retardant article having the flame retardant film 1 of the invention on one surface of the substrate 2 as shown in FIG. 1 and a flame retardant article having the flame retardant film 1 of the invention on both surfaces of the substrate 2 as shown in FIG. 2.

The substrate preferably has a sheet shape or a plate shape. Incidentally, the substrate may have a curved surface. Namely, herein, the case of "sheet shape" means not only a flat sheet shape but also a sheet shape having a three-dimensional curved surface and the case of "plate shape" means not only a flat plate shape but also a plate shape having a three-dimensional curved surface. Moreover, the substrate may be either a non-porous one or a porous one. Incidentally, a layered material composed of a pressure-sensitive adhesive or an adhesive is not included in the substrate in the invention.

As for a material of the substrate, any suitable substrates may be adopted.

As the thickness of the substrate, any suitable thickness may be adopted depending on the purpose. The thickness of the substrate is preferably from 3 µm to 500 µm, more preferably from 10 µm to 300 µm, further preferably from 10 µm to 200 µm, and particularly preferably from 15 µm to 200 µm.

To the flame retardant article of the invention, functional layers such as an antifouling layer, an antistatic layer, a light diffusing layer, an antireflection layer, an ultraviolet absorbing layer, a heat shielding layer, a heat insulating layer, a heat conducting layer and a solvent resistant layer can be imparted within the range where the flame retardancy is not impaired.

EXAMPLES

The following will describe the invention more specifically with reference to Examples and Comparative Examples. However, the invention should not be construed as being limited thereto. In the flowing description, "part(s)" and "%" are shown on the weight basis unless otherwise specified.

<Preparation of Evaluation Sample>

A flame retardant material was applied on one surface of a PET film (LUMIRROR S10, manufactured by Toray Industries, Inc.) having an A4 size and a thickness of 75 µm so that the film thickness of the flame retardant material became 30 µm, followed by curing at 120° C. for 1 hour. Then, the flame retardant material was applied on the opposite surface of the PET film so that the film thickness of the flame retardant material became also 30 µm, thereby preparing an evaluation sample.

<Flame Retardancy Evaluation>

As flame retardancy evaluation, investigation was performed in accordance with the test method of the UL-94 standard.

Namely, an evaluation sample was cut into a size of 12.7 mm×127 mm, which was used as a specimen. A lower end of the specimen held vertically was brought into contact with flame having a length of 19 mm of a gas burner for 10 seconds. In the case where combustion was stopped within 30 seconds, the specimen was further brought into contact with the flame for another 10 seconds. Gauze was placed 30 cm below and its combustion was also confirmed. The evaluation was conducted according to the following criteria.

AA: a case where all tests were cleared and the specimen shape was maintained.
A: a case where the first and second contacts with flame for 10 seconds were cleared but the specimen shape was not maintained.
B: a case where specimen was ignited by the second contact with flame.
C: a case where specimen was ignited by the first contact with flame.

<Softness Evaluation of Film>

After an evaluation sample was folded at an angle of 180° and was allowed to stand for 5 seconds, it was returned as before and, at that time, the damage of the fold was investigated. The evaluation was conducted according to the following criteria.
A: No damage was observed.
B: A wrinkle remained.
C: The sample was completely cracked.

<Film Strength Test 1>

A PET film (LUMIRROR S10, manufactured by Toray Industries, Inc.) having a thickness of 38 µm was laminated to an evaluation sample with pressing by means of a rubber roller, followed by standing overnight. Thereafter, parting properties of film were investigated when the PET film was peeled off.
A: No parting was observed.
B: Slight parting was observed (a size of less than 5 mm)
C: Remarkable parting was observed (a size of 5 mm or more).

<Film Strength Test 2>

The parting properties of film were investigated in the same manner as in Film Strength Test 1 except that a PET film (MRF38, manufactured by Mitsubishi Plastics, Inc.) having a thickness of 38 µm, which had been subjected to a release treatment, was used. The evaluation was conducted according to the following criteria.
A: No parting was observed.
B: Slight parting was observed (a size of less than 5 mm).
C: Remarkable parting was observed (a size of 5 mm or more).

<Pencil Hardness Test>

A scratch was investigated when an evaluation sample was scratched with a pencil having a pencil hardness of B. The evaluation was conducted according to the following criteria.
5: No peeling was observed on the surface.
4: Slight peeling was observed on the surface.
3: Peeling was observed on the surface.
2: Slight peeling from the substrate was observed.
1: Peeling from the substrate was observed.

<Total Light Transmittance and Haze Value>

Using a haze meter (HM150, manufactured by Murakami Color Research Laboratory Co., Ltd.), the total light transmittance and the haze value of an evaluation sample were measured.

Example 1

An addition type silicone resin (two-component type RTV silicone rubber, KE-1950-20AB, manufactured by Shin-Etsu Chemical Co., Ltd., KE-1950-20A (20 g)+KE-1950-20B (20 g)): 40 g and toluene: 100 g were blended and, after the resin was dissolved in toluene, a flame retardant filler (aluminum hydroxide, HIGILITE H-43M, manufactured by Showa Denko K.K.): 40 g was added thereto and stirring at 2000 rounds/minute for 2 minutes was performed by a Disper to obtain a flame retardant material (1).

Various evaluation results are shown in Tables 1 and 2.

Example 2

An addition type silicone resin (two-component type RTV silicone rubber, KE-1950-20AB, manufactured by Shin-Etsu Chemical Co., Ltd., KE-1950-20A (20 g)+KE-1950-20B (20 g)): 40 g and toluene: 100 g were blended and, after the resin was dissolved in toluene, HIGILITE H-43M (aluminum hydroxide, manufactured by Showa Denko K.K.): 40 g was added thereto as a flame retardant filler and stirring at 2000 rounds/minute for 2 minutes was performed by a Disper to obtain a flame retardant composition.

The resulting flame retardant composition was placed in a 225 ml glass bottle, then zirconia beads having a particle size of 2 mm: 150 g was added thereto, and mill grinding was performed in a paint shaker (product name "SCANDEX" manufactured by LAU (Germany)) over a period of 3 hours to obtain a flame retardant material (2).

Various evaluation results are shown in Tables 1 and 2.

Example 3

A flame retardant material (3) was obtained in the same manner as in Example 2 except that the solvent was changed to ethyl acetate.
Various evaluation results are shown in Tables 1 and 2.

Example 4

A flame retardant material (4) was obtained in the same manner as in Example 2 except that the solvent was changed to 2-propanol.
Various evaluation results are shown in Tables 1 and 2.

Example 5

A flame retardant material (5) was obtained in the same manner as in Example 3 except that the flame retardant filler was changed to glass frit (VS0053M2, manufactured by Nippon Frit Co., Ltd.).
Various evaluation results are shown in Tables 1 and 2.

Example 6

A flame retardant material (6) was obtained in the same manner as in Example 2 except that KB-1012-AB, (two-component type RTV silicone rubber, manufactured by Shin-Etsu Chemical Co., Ltd., KE-1012-A (20 g)+KE-1012-B (20 g)): 40 g was used as an addition type silicone resin.
Various evaluation results are shown in Tables 1 and 2.

Example 7

A flame retardant material (7) was obtained in the same manner as in Example 1 except that the blending amount of the flame retardant filler (aluminum hydroxide, HIGILITE H-43M, manufactured by Showa Denko K.K.) was changed to 80 g.
Various evaluation results are shown in Tables 1 and 2.

Example 8

A flame retardant material (8) was obtained in the same manner as in Example 1 except that the blending amount of the flame retardant filler (aluminum hydroxide, HIGILITE H-43M, manufactured by Showa Denko K.K.) was changed to 20 g.
Various evaluation results are shown in Tables 1 and 2.

Example 9

A flame retardant material (9) was obtained in the same manner as in Example 2 except that the blending amount of the flame retardant filler (aluminum hydroxide, HIGILITE H-43M, manufactured by Showa Denko K.K.) was changed to 80 g.
Various evaluation results are shown in Tables 1 and 2.

Example 10

A flame retardant material (10) was obtained in the same manner as in Example 2 except that the blending amount of the flame retardant filler (aluminum hydroxide, HIGILITE H-43M, manufactured by Showa Denko K.K.) was changed to 20 g.
Various evaluation results are shown in Tables 1 and 2.

Comparative Example 1

A flame retardant material (C1) was obtained in the same manner as in Example 1 except that the flame retardant filler was not used.
Various evaluation results are shown in Tables 1 and 2.

Comparative Example 2

A flame retardant material (C2) was obtained in the same manner as in Example 6 except that the flame retardant filler was not used and the mill grinding was not performed.
Various evaluation results are shown in Tables 1 and 2.

Comparative Example 3

A flame retardant material (C3) was obtained in the same manner as in Example 2 except that a silicone-based fiber treating agent (Polon MF-23, manufactured by Shin-Etsu Chemical Co., Ltd.) was used instead of the addition type silicone resin and the solvent was changed to water.
Various evaluation results are shown in Tables 1 and 2.

Comparative Example 4

A flame retardant material (C4) was obtained in the same manner as in Example 2 except that a condensation type silicone resin (X-40-9246, manufactured by Shin-Etsu Chemical Co., Ltd.) was used instead of the addition type silicone resin and the solvent was changed to 2-propanol.
Various evaluation results are shown in Tables 1 and 2.

TABLE 1

| | Resin | | Filler | | | Mill |
|---|---|---|---|---|---|---|
| | Kind | Amount | Kind | Amount | Solvent | grinding |
| Example 1 | KE-1950-20AB | 40 g | H-43M | 40 g | toluene | Not performed |
| Example 2 | KE-1950-20AB | 40 g | H-43M | 40 g | toluene | Performed |
| Example 3 | KE-1950-20AB | 40 g | H-43M | 40 g | ethyl acetate | Performed |
| Example 4 | KE-1950-20AB | 40 g | H-43M | 40 g | 2-propanol | Performed |
| Example 5 | KE-1950-20AB | 40 g | VS0053M2 | 40 g | ethyl acetate | Performed |
| Example 6 | KE-1012-AB | 40 g | H-43M | 40 g | toluene | Performed |
| Example 7 | KE-1950-20AB | 40 g | H-43M | 80 g | toluene | Not performed |
| Example 8 | KE-1950-20AB | 40 g | H-43M | 20 g | toluene | Not performed |

TABLE 1-continued

| | Resin | | Filler | | | Mill |
|---|---|---|---|---|---|---|
| | Kind | Amount | Kind | Amount | Solvent | grinding |
| Example 9 | KE-1950-20AB | 40 g | H-43M | 80 g | toluene | Performed |
| Example 10 | KE-1950-20AB | 40 g | H-43M | 20 g | toluene | Performed |
| Comparative Example 1 | KE-1950-20AB | 40 g | none | none | toluene | Not performed |
| Comparative Example 2 | KE-1012-AB | 40 g | none | none | toluene | Not performed |
| Comparative Example 3 | Polon MF-23 | 40 g | H-43M | 40 g | water | Performed |
| Comparative Example 4 | X-40-9246 | 40 g | H-43M | 40 g | 2-propanol | Performed |

TABLE 2

| | Flame retardancy | Softness of film | Film strength test 1 | Film strength test 2 | Pencil Hardness test | Haze value | Total light transmittance (%) |
|---|---|---|---|---|---|---|---|
| Example 1 | AA | A | B | B | 2 | 89.9 | 25.6 |
| Example 2 | AA | A | A | A | 3 | 78.2 | 64.7 |
| Example 3 | AA | A | A | A | 3 | 88.3 | 57.3 |
| Example 4 | AA | A | A | A | 3 | 89.3 | 59.0 |
| Example 5 | AA | A | A | A | 4 | 88.4 | 80.6 |
| Example 6 | AA | A | C | C | 1 | 89.1 | 58.8 |
| Example 7 | AA | A | B | B | 2 | 91.9 | 21.5 |
| Example 8 | A | A | A | B | 3 | 81.1 | 49.8 |
| Example 9 | AA | A | A | A | 3 | 80.3 | 61.4 |
| Example 10 | A | A | A | A | 3 | 75.2 | 68.5 |
| Comparative Example 1 | B | A | A | A | 3 | 3.8 | 94.6 |
| Comparative Example 2 | C | A | A | A | 3 | 3.5 | 95.3 |
| Comparative Example 3 | C | A | C | C | 1 | 85.4 | 68.1 |
| Comparative Example 4 | A | C | A | A | 1 | 82.4 | 65.3 |

Example 11

A flame retardant filler (aluminum hydroxide, HIGILITE H-43M, manufactured by Showa Denko K.K.): 20 g was added to a self-crosslinking type silicone resin (Polon MF-56, solid matter concentration=40%, manufactured by Shin-Etsu Chemical Co., Ltd.): 50 g, and mill grinding/dispersion was performed in a paint shaker (product name "SCANDEX" manufactured by LAU (Germany)) over a period of 3 hours to obtain a flame retardant material (11).

Various evaluation results are shown in Tables 3 and 4.

Example 12

A flame retardant filler (aluminum hydroxide, HIGILITE H-43M, manufactured by Showa Denko K.K.): 21 g was added to a self-crosslinking type silicone resin (X-52-1631, solid matter concentration=42%, manufactured by Shin-Etsu Chemical Co., Ltd.): 50 g, and mill grinding/dispersion was performed in a paint shaker (product name "SCANDEX" manufactured by LAU (Germany)) over a period of 3 hours to obtain a flame retardant material (12).

Various evaluation results are shown in Tables 3 and 4.

Example 13

A flame retardant filler (aluminum hydroxide, HIGILITE H-43M, manufactured by Showa Denko K.K.): 20 g was added to a self-crosslinking type silicone resin (KM-2002T, solid matter concentration=40%, manufactured by Shin-Etsu Chemical Co., Ltd.): 50 g, and mill grinding/dispersion was performed in a paint shaker (product name "SCANDEX" manufactured by LAU (Germany)) over a period of 3 hours to obtain a flame retardant material (13).

Various evaluation results are shown in Tables 3 and 4.

Example 14

A flame retardant filler (aluminum hydroxide, HIGILITE H-43M, manufactured by Showa Denko K.K.): 40 g was added to an O/W type emulsion in which a reactive silicone was emulsified with an emulsifier (Polon MR, solid matter concentration=60%, manufactured by Shin-Etsu Chemical Co., Ltd.): 50 g, and mill grinding/dispersion was performed in a paint shaker (product name "SCANDEX" manufactured by LAU (Germany)) over a period of 3 hours. Thereafter, CAT-LZ-1 (solid matter concentration=14%, manufactured by Shin-Etsu Chemical Co., Ltd.): 50 g was added thereto as a curing catalyst to obtain a flame retardant material (14).

Various evaluation results are shown in Tables 3 and 4.

Example 15

A flame retardant filler (aluminum hydroxide, HIGILITE H-43M, manufactured by Showa Denko K.K.): 40 g was added to an O/W type emulsion in which a reactive silicone was emulsified with an emulsifier (Polon MK-206, solid matter concentration=32%, manufactured by Shin-Etsu Chemical Co., Ltd.): 65 g, and mill grinding/dispersion was performed in a paint shaker (product name "SCANDEX" manufactured by LAU (Germany)) over a period of 3 hours. Thereafter, CAT-FZ (solid matter concentration=18%, manufactured by Shin-Etsu Chemical Co., Ltd.): 50 g was added thereto as a curing catalyst to obtain a flame retardant material (15).

Various evaluation results are shown in Tables 3 and 4.

Example 16

A flame retardant filler (aluminum hydroxide, HIGILITE H-43M, manufactured by Showa Denko K.K.): 20 g was added to a self-crosslinking type silicone resin (X-51-1318, solid matter concentration=40%, manufactured by Shin-Etsu Chemical Co., Ltd.): 50 g, and mill grinding/dispersion was performed in a paint shaker (product name "SCANDEX" manufactured by LAU (Germany)) over a period of 3 hours to obtain a flame retardant material (16).

Various evaluation results are shown in Tables 3 and 4.

Example 17

A silicone rubber powder (X-52-1133, solid matter concentration=51%, manufactured by Shin-Etsu Chemical Co., Ltd.): 20 g was added to a silicone rubber film-forming type emulsion (KM-9749, solid matter concentration=43%, manufactured by Shin-Etsu Chemical Co., Ltd.): 25 g, then a flame retardant filler (aluminum hydroxide, HIGILITE H-43M, manufactured by Showa Denko K.K.): 20 g was further added thereto, and mill grinding/dispersion was performed in a paint shaker (product name "SCANDEX" manufactured by LAU (Germany)) over a period of 3 hours to obtain a flame retardant material (17).

Various evaluation results are shown in Tables 3 and 4.

Example 18

A flame retardant filler (aluminum hydroxide, HIGILITE H-43M, manufactured by Showa Denko K.K.): 22 g was added to a self-crosslinking type silicone resin (KM-2002L-1, solid matter concentration=44%, manufactured by Shin-Etsu Chemical Co., Ltd.): 50 g, and mill grinding/dispersion was performed in a paint shaker (product name "SCANDEX" manufactured by LAU (Germany)) over a period of 3 hours to obtain a flame retardant material (18).

Various evaluation results are shown in Tables 3 and 4.

Comparative Example 5

A flame retardant material (C5) was obtained in the same manner as in Example 11 except that the flame retardant filler was not used and the mill grinding was not performed.

Various evaluation results are shown in Tables 3 and 4.

Comparative Example 6

A flame retardant material (C6) was obtained in the same manner as in Example 13 except that the flame retardant filler was not used and the mill grinding was not performed.

Various evaluation results are shown in Tables 3 and 4.

TABLE 3

| | Resin | | Filler | | Mill grinding |
|---|---|---|---|---|---|
| | Kind | Amount (Solid matter) | Kind | Amount | |
| Example 11 | Polon MF-56 | 50 g | H-43M | 20 g | Performed |
| Example 12 | X-52-1631 | 50 g | H-43M | 21 g | Performed |
| Example 13 | KM-2002T | 50 g | H-43M | 20 g | Performed |
| Example 14 | Polon MR | 50 g | H-43M | 40 g | Performed |
| Example 15 | Polon MK-206 | 65 g | H-43M | 40 g | Performed |
| Example 16 | X-51-1318 | 50 g | H-43M | 20 g | Performed |
| Example 17 | KM-9749 + X-52-1133 | 25 g + 20 g | H-43M | 20 g | Performed |
| Example 18 | KM-2002L-1 | 50 g | H-43M | 22 g | Performed |
| Comparative Example 5 | Polon MF-56 | 50 g | none | none | Not performed |
| Comparative Example 6 | KM-2002T | 50 g | none | none | Not performed |

TABLE 4

| | Flame retardancy | Softness of film | Film strength test 1 | Film strength test 2 | Pencil Hardness test | Haze value | Total light transmittance (%) |
|---|---|---|---|---|---|---|---|
| Example 11 | A | A | A | A | 2 | 98.2 | 56.1 |
| Example 12 | A | A | A | A | 3 | 97.4 | 57.2 |
| Example 13 | A | A | A | A | 3 | 98.6 | 54.8 |
| Example 14 | A | B | B | B | 3 | 98.3 | 55.2 |
| Example 15 | A | B | B | B | 4 | 98.7 | 54.3 |
| Example 16 | A | A | A | A | 1 | 99.2 | 55.7 |
| Example 17 | A | A | A | A | 2 | 99.5 | 53.8 |
| Example 18 | A | B | A | A | 3 | 98.4 | 56.2 |
| Comparative Example 5 | C | A | B | B | 3 | 10.5 | 89.5 |
| Comparative Example 6 | C | A | B | B | 3 | 12.2 | 91.1 |

The present application is based on Japanese Patent Applications No. 2014-130997 filed on Jun. 26, 2014 and No. 2014-172251 filed on Aug. 27, 2014, and the contents are incorporated herein by reference.

The flame retardant material, the flame retardant film and the flame retardant article of the invention can be utilized in various uses where flame retardancy is required.

DESCRIPTION OF REFERENCE NUMERALS AND SIGNS

1: Flame retardant film
2: Substrate

What is claimed is:

1. A flame retardant material comprising:
    a silicone resin; and
    a flame retardant filler,
    wherein the silicone resin comprises an addition silicone resin and optionally comprises one or more selected from the group consisting of a self-crosslinking silicone resin, a silicone resin component of a silicone rubber film-forming emulsion and a silicone rubber powder,
    wherein the flame retardant filler is a metal hydroxide, and the addition silicone resin comprises an O/W emulsion in which a reactive silicone is emulsified with an emulsifier.

2. The flame retardant material according to claim 1, wherein the flame retardant material further comprises an addition silicone resin which is a two-component RTV silicone rubber.

3. The flame retardant material according to claim 1, wherein a content ratio of a total amount of solid matter of the addition silicone resin, solid matter of the self-crosslinking silicone resin, solid matter of the silicone rubber film-forming emulsion and the silicone rubber powder to an amount of the flame retardant filler is, in terms of weight ratio, as follows:
    (solid matter of addition silicone resin+solid matter of self-crosslinking silicone resin+solid matter of silicone rubber film-forming emulsion+silicone rubber powder):flame retardant filler=5:1 to 1:5.

4. The flame retardant material according to claim 1, which further comprises a solvent.

5. A flame retardant film formed from the flame retardant material according to claim 1.

6. A flame retardant article having the flame retardant film according to claim 5.

7. The flame retardant material according to claim 1, wherein the flame retardant filler is at least one selected from the group consisting of aluminum hydroxide and magnesium hydroxide.

8. The flame retardant article according to claim 6, wherein the flame retardant film is applied to opposite sides of a substrate.

* * * * *